US010792768B2

(12) United States Patent
Izumi

(10) Patent No.: US 10,792,768 B2
(45) Date of Patent: Oct. 6, 2020

(54) LASER MACHINING HEAD WITH STAIN PREVENTION FOR PROTECTION WINDOW

(71) Applicant: Fanuc Corporation, Minamitsuru-gun, Yamanashi (JP)

(72) Inventor: Takashi Izumi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/270,830

(22) Filed: Feb. 8, 2019

(65) Prior Publication Data

US 2019/0255661 A1    Aug. 22, 2019

(30) Foreign Application Priority Data

Feb. 16, 2018    (JP) .................................. 2018-026096

(51) Int. Cl.
| | |
|---|---|
| B23K 26/70 | (2014.01) |
| B23K 26/14 | (2014.01) |
| B23K 26/142 | (2014.01) |
| B23K 26/06 | (2014.01) |

(52) U.S. Cl.
CPC ........ B23K 26/706 (2015.10); B23K 26/0648 (2013.01); B23K 26/142 (2015.10); B23K 26/1438 (2015.10); B23K 26/702 (2015.10)

(58) Field of Classification Search
CPC .............. B23K 26/706; B23K 26/702; B23K 26/1438; B23K 26/142
See application file for complete search history.

(56) References Cited

U.S. PATENT DOCUMENTS

| | | | |
|---|---|---|---|
| 10,293,432 B2 | 5/2019 | Fomin et al. | |
| 2003/0197909 A1* | 10/2003 | Beyer | B08B 15/04 359/509 |
| 2012/0037604 A1* | 2/2012 | Shikata | G02B 7/008 219/121.67 |
| 2014/0042133 A1* | 2/2014 | Weick | B23K 26/032 219/121.81 |
| 2019/0118291 A1 | 4/2019 | Nakagawa et al. | |
| 2019/0160592 A1 | 5/2019 | Akahoshi et al. | |
| 2019/0255652 A1* | 8/2019 | Izumi | B23K 26/04 |

FOREIGN PATENT DOCUMENTS

| | | |
|---|---|---|
| CN | 202278309 U | 6/2012 |
| CN | 203227932 U | 10/2013 |
| CN | 104870138 A | 8/2015 |
| CN | 105102176 A | 11/2015 |
| JP | H05-212576 A | 8/1993 |
| JP | H11-239889 A | 9/1999 |
| JP | 2000263276 A | 9/2000 |
| JP | 2001259872 A | 9/2001 |

(Continued)

*Primary Examiner* — Geoffrey S Evans
(74) *Attorney, Agent, or Firm* — RatnerPrestia

(57) ABSTRACT

A laser machining head includes a protection window disposed inclined with respect to an optical axis of a laser beam, an inflow port disposed downstream of the protection window and configured to allow a gas to flow in, and a flow dividing projection configured to divide the gas into a first laminar flow flowing along parallel to a surface of the protection window and a second laminar flow flowing toward a workpiece. The flow dividing projection is disposed in a position opposing to the inflow port with the optical axis of the laser beam as the center.

15 Claims, 7 Drawing Sheets

(56) References Cited

FOREIGN PATENT DOCUMENTS

| | | | |
|---|---|---|---|
| JP | 2007-021574 A | | 2/2007 |
| JP | 2007021505 A | | 2/2007 |
| JP | 2007216281 A | * | 8/2007 |
| JP | 2015-009270 A | | 1/2015 |
| KR | 20160087510 A | | 7/2016 |
| WO | 2010113244 A1 | | 10/2010 |
| WO | 2014063153 A1 | | 4/2014 |
| WO | 2017203862 A1 | | 11/2017 |
| WO | 2017209086 A1 | | 12/2017 |
| WO | 2018029432 A1 | | 2/2018 |

* cited by examiner

LASER MACHINING HEAD WITH STAIN PREVENTION FOR PROTECTION WINDOW

CROSS-REFERENCE TO RELATED APPLICATIONS

This application is a new U.S. Patent Application that claims benefit of Japanese Patent Application No. 2018-026096, filed Feb. 16, 2018, the disclosure of this application is being incorporated herein by reference in its entirety for all purposes.

BACKGROUND OF THE INVENTION

1. Field of the Invention

The present invention relates to a laser machining head, and particularly a laser machining head with stain prevention for a protection window.

2. Description of the Related Art

A laser machining device is configured to transmit a laser beam generated by a laser oscillator via optical fiber or the like, focus the laser beam at a workpiece using a condenser lens provided in a laser machining head, and irradiate the workpiece with the laser beam. A protection window is provided between the condenser lens and the workpiece, and configured to protect the condenser lens from sputters, fumes, dust, or the like (hereinafter, simply referred to as "dust"). Also, shield gas, assist gas, or the like (hereinafter, simply referred to as "gas") is supplied in a region for machining to avoid deterioration of the quality of machining.

In laser machining, when dust generated during machining attaches to the protection window or the like, the laser beam is prevented from focusing and the quality of the machining is deteriorated. To prevent staining of the protection window, for example, JP H11-239889 A proposes a laser weld head including a nozzle discharging assist gas injected from a gas injection port at a focusing side of the condenser lens, and a rectifying plate with a ring shape having a plane perpendicular to an optical axis of the laser beam in an interior space between the nozzle and the condenser lens. The closer to the workpiece, the smaller an inner diameter of the rectifying plate is. A gas injected from the gas injection port along the rectifying plate is ejected from the interior space to an outer space of a nozzle holder.

JP 2015-9270 A proposes a laser machining head including a protection glass disposed at an opening through which a laser beam is emitted and an air blow nozzle spraying air along an outer side of the protection glass. Providing the outer side of the protection glass and an edge of the opening on the same plane prevents mist-shaped contaminants generated during laser machining from attaching to a surface of the protection glass.

JP 2007-21574 A proposes a laser machining head including an air supplying section formed as a gap in a tapered shape. The air supplying section generates air in a shape of a curtain toward a workpiece, flows and focuses the air down a tapered surface of an interior of a main body of the nozzle, and focuses the air outside of the main body of the nozzle. Cutting off the interior from the outside of the main body of the nozzle prevents sputters or fumes from entering into the interior of the main body of the nozzle.

JP H5-212576 A proposes, instead of a machining head with stain prevention for the protection glass, a machining head minimizing reflection at the protection glass by inclining the protection glass ±3 to 7 degrees from a horizontal plane.

SUMMARY OF THE INVENTION

Although staining of a protection window is prevented by spraying gas toward dust flying to the protection window, the frequency of exchanging the protection window is still high. Therefore, a technology further preventing staining of the protection window with a simple configuration is needed.

According to an aspect of the disclosure, a laser machining head with stain prevention includes a protection window disposed inclined with respect to an optical axis of a laser beam, an inflow port disposed downstream of the protection window and configured to allow gas to flow in, a flow dividing projection configured to divide the gas into a first laminar flow flowing along parallel to a surface of the protection window and a second laminar flow flowing toward a workpiece.

DETAILED DESCRIPTION

Figure 1:
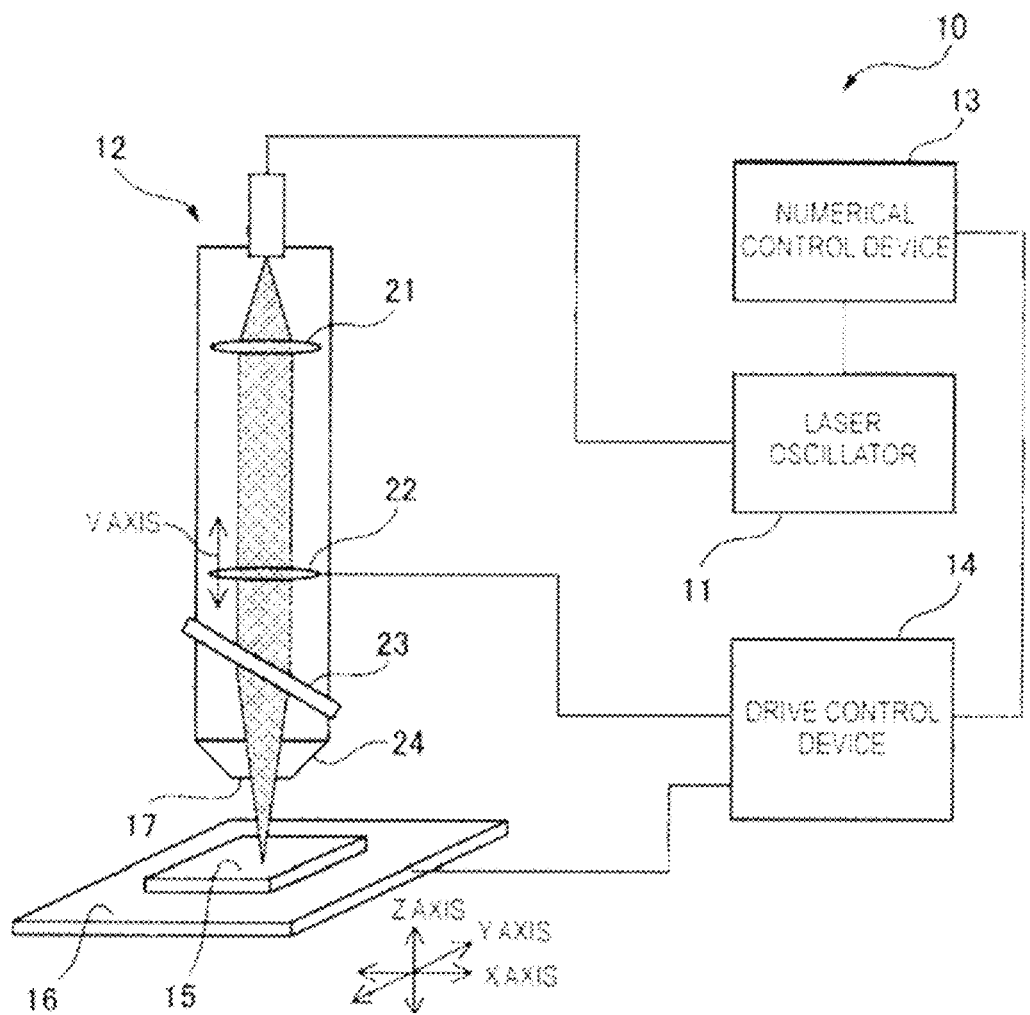
FIG. 1 is a schematic diagram illustrating an overall configuration of a laser machining device according to an embodiment.

Embodiments of the disclosure will be described below in detail with reference to the accompanying drawings. For each drawing, same or similar components are denoted by same or similar reference numerals. Also, the embodiments described below do not limit the technical scope of the invention or the meaning of terms set forth in the claim's. Here, a term "upstream" in the specification refers to an upstream side in a route of the laser beam and a term "downstream" refers to a downstream side in the route of the laser beam proceeding in a forward direction.

FIG. 1 is a schematic diagram illustrating the overall configuration of a laser machining device 10 according to an embodiment. The laser machining device 10 includes a laser oscillator 11, a laser machining head 12 guiding a laser beam from the laser oscillator 11 and irradiating a workpiece 15 with the laser beam, a numerical control device 13 controlling the entirety of the laser machining device 10, and a drive control device 14 controlling the driving of a machining table 16 along an X axis, a Y axis, and a Z axis, and the driving of a condenser lens 22 along a V axis. The laser machining head 12 includes a collimation lens 21 for collimating the laser beam from the laser oscillator 11, a condenser lens 22 focusing the laser beam at the workpiece 15, a protection window 23 protecting the condenser lens 22 from dust, and a nozzle 24 spraying gas from an outflow port 17 to the workpiece 15.

The protection window 23 is composed of glass material or the like surface-treated with a reflection coating. The protection window 23 is disposed to block off an internal wall of the laser machining head 23 to protect the condenser lens 22 from dust attaching. Also, the protection window 23 is disposed inclined with respect to an optical axis of the laser beam. The inclination angle of the protection window 23 is preferably 15 degrees or greater. Thereby, a collision angle of dust flying toward the protection window 23 during laser machining of the workpiece 15 becomes shallow.

Figure 2A:
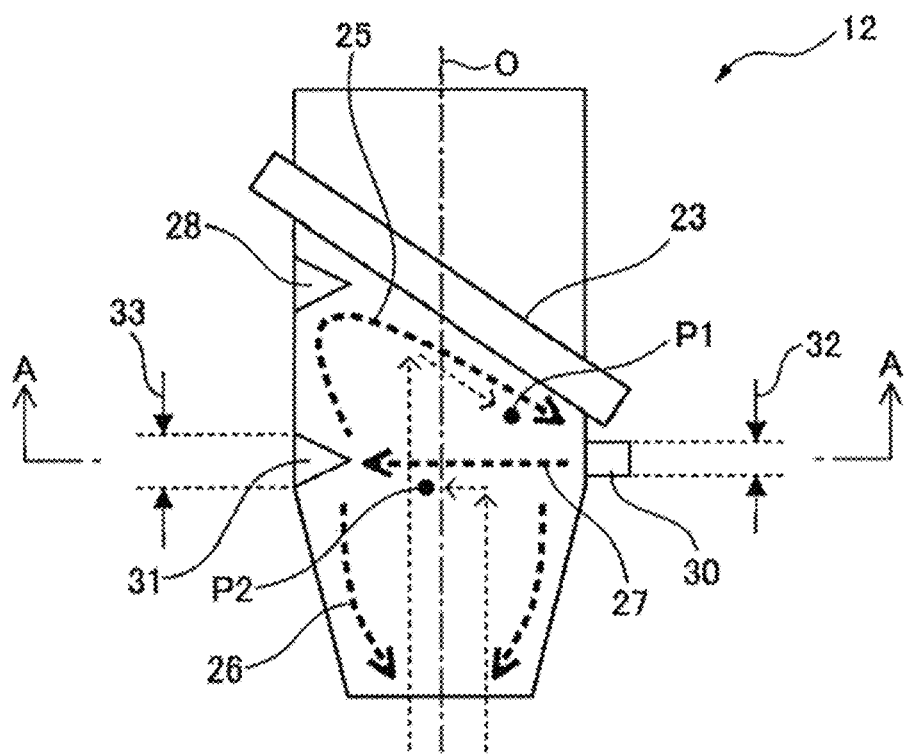
FIG. 2A is a longitudinal cross-sectional view of a laser machining head according to a first embodiment.

FIG. 2A is a longitudinal cross-sectional view of the laser machining head 12 according to the first embodiment. The laser machining head 12 further includes an inflow port 30 disposed downstream of the protection window 23 and configured to allow gas to flow in, and a flow dividing projection 31 configured to divide a gas flow 27 flowed from the inflow port 30 into a first laminar flow 25 flowing along parallel to a surface of the protection window 23 and a second laminar flow 26 flowing toward the workpiece 15. As the first laminar flow 25 flows along parallel to the surface of the protection window 23, dust P1 is blocked by the first laminar flow 25 before colliding with the protection window.

The flow dividing projection 31 is disposed at a position opposing to the inflow port 30 with an optical axis O of the laser beam as the center. As the gas flow 27 flowed in from the inflow port 30 flows toward the flow dividing projection 31, dust P2 is blocked by the gas flow 27 before reaching the first laminar flow 25. The flow dividing projection 31 has a tapered shape tapering toward the inflow port 30 in a longitudinal cross-sectional view including the optical axis O of the laser beam. Since the flow dividing projection 31 has a tapered shape, when the gas flow 27 flowed in from the inflow port 30 hits the flow dividing projection 31 and divides into two flows, one of the two flows is facilitated to direct to the protection window 23 and the other is facilitated to direct to the workpiece 15. The laser machining head 12 may further includes a rectifying projection 28 upstream of the flow dividing projection 31. The rectifying projection 28 facilitates converting the one flow, divided at the flow dividing projection 31 and facilitated to direct to the protection window 23, to the first laminar flow 25 flowing along parallel to the surface of the protection window 23.

The inflow port 30 includes a first width 32 in a direction of the optical axis O of the laser beam and the flow dividing projection 31 includes a second width 33 in a direction of the optical axis O of the laser beam, and preferably, the first width 32 is formed to be smaller than the second width 33. Thereby, when the gas flow 27 flowed in from the inflow port 30 hits the flow dividing projection 31 and divides into two, most of the one flow directs to the protection window 23 and most of the other flow directs to the workpiece 15.

Figure 2B:
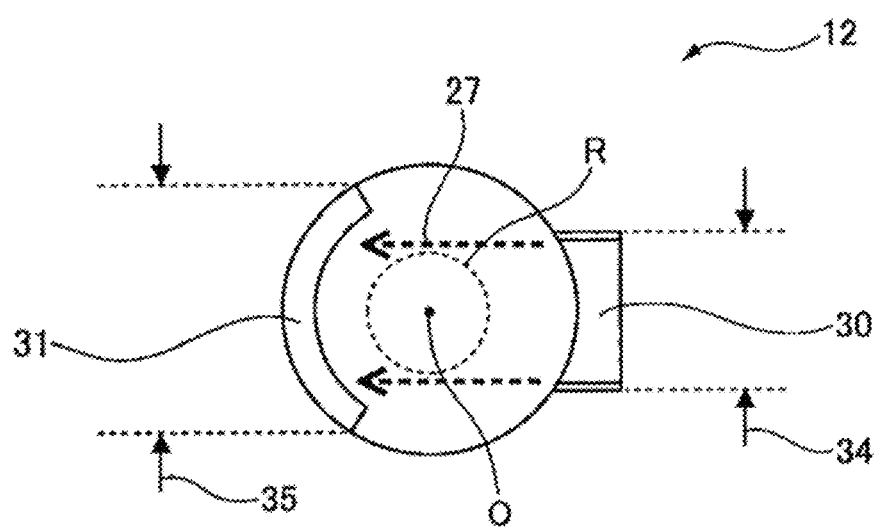
FIG. 2B is a lateral cross-sectional view of a laser machining head taken along a cross-section A-A in FIG. 2A.

FIG. 2B is a lateral cross-sectional view of the laser machining head 12 corresponding to a cross section A-A in FIG. 2A. The inflow port 30 includes a third width 34 in a direction perpendicular to the optical axis O of the laser beam and the flow dividing projection 31 includes a fourth width 35 in a direction perpendicular to the optical axis O of the laser beam. Each of the third width 34 and the fourth width 35 is formed to be preferably larger than a beam diameter R of the laser beam. Thereby, the first laminar flow 25 flowing along parallel to the surface of the protection window 23 becomes a flow larger than a beam diameter R of the laser beam and an attachment of dust to a transit area of the laser beam in the protection window 23 is prevented. Also, the third width 34 of the inflow port 30 may be formed to be smaller than the fourth width 35 of the flow dividing projection 31. Thereby, when the gas flow 27 flowed in from the inflow port 30 hits the flow dividing projection 31 and divides into two, most of the one flow directs to the protection window 23 and most of the other flow directs to the workpiece 15.

Figure 2C:
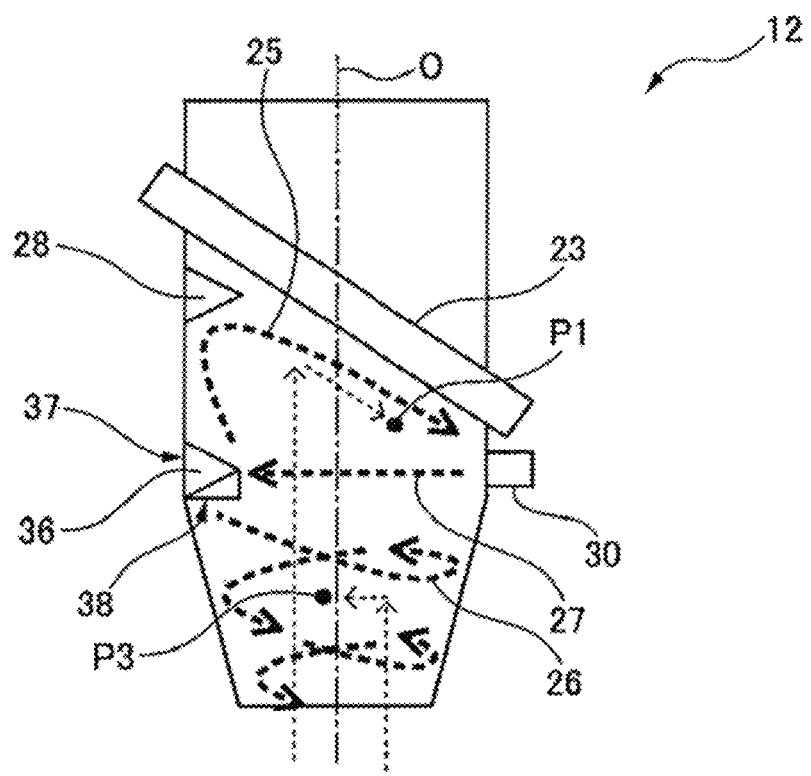
FIG. 2C is a longitudinal cross-sectional view of a laser machining head including a flow dividing projection of a modified example.
Figure 2D:
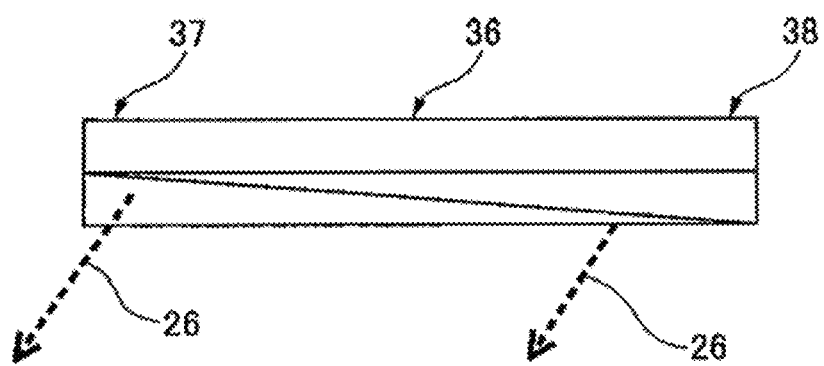
FIG. 2D is a front view illustrating a flow dividing projection of a modified example from an inflow port.

FIG. 2C is a longitudinal cross-sectional view of the laser machining head 12 including a flow dividing projection 36 of a modified example. FIG. 2D is a front view of the flow dividing projection 36 of the modified example from the inflow port 30. The flow dividing projection 36 has a shape that transits from a tapered shape 37 tapering toward the inflow port 30 to a trapezoid shape 38 in a longitudinal cross-sectional view including the optical axis O of the laser beam. Thereby, the second laminar flow 26 flowing toward the workpiece becomes a flow spirally turning with the optical axis O of the laser beam as the center and minimizes an occurrence of turbulence. Also, dust P3 is blocked by the second laminar flow 26 before reaching the gas flow 27 flowed in from the inflow port 30.

According to the laser machining head 12 of the first embodiment, the protection window 23 is disposed inclined with respect to the optical axis O of the laser beam, thereby the collision angle of dust P1 against the protection window 23 becomes shallow. A three layered gas flow including the first laminar flow 25 flowing along parallel to the surface of the protection window 23, the gas flow 27 flowing in from the inflow port 30, and the second laminar flow 26 spirally turning to the workpiece blocks dust P1 to P3 before the dust reaches the protection window 23 in three stages. Thereby, a simple configuration enables further prevent staining of the protection window 23.

Figure 3A:
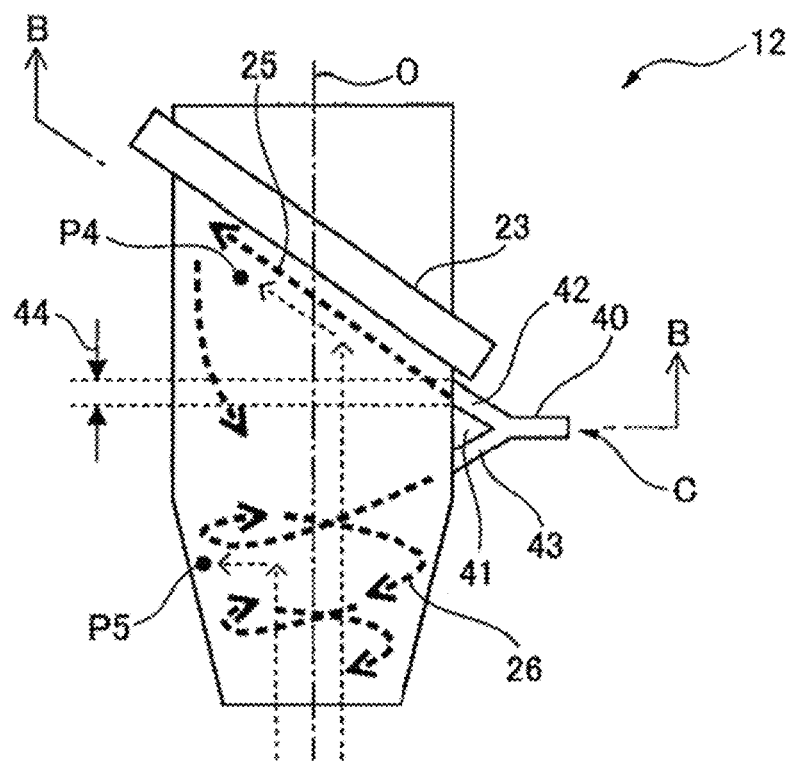
FIG. 3A is a longitudinal cross-sectional view of a laser machining head according to a second embodiment.

FIG. 3A is a longitudinal cross-sectional view of the laser machining head 12 according to a second embodiment. The laser machining head 12 according to the second embodiment includes a protection window 23 disposed inclined with respect to the optical axis O of the laser beam, an inflow port 40 disposed downstream of the protection window 23 and configured to allow a gas to flow in, a flow dividing projection 41 dividing the inflow port 40 into a direction parallel to a surface of the protection window and a direction toward a workpiece and forming a first inflow port 42 and a second inflow port 43. The flow dividing projection 41 has a tapered shape tapering toward a direction going away from the laser beam in the longitudinal cross-section including the optical axis O of the laser beam. Since the flow dividing projection 41 has a tapered shape, when a gas flow flowed in from the inflow port 40 hits the flow dividing projection 41 and divides into two, one flow directs to the protection window 23 and the other flow directs to the workpiece 15.

The first inflow port 42 is directed toward a direction parallel to the surface of the protection window 23 and configured to allow the first laminar flow 25 to flow from downstream to upstream of the protection window 23. Thereby, dust P4 is blocked by the first laminar flow 25 before colliding with the protection window 23. On the other hand, the second inflow port 43 is directed toward the workpiece and configured to allow the second laminar flow 26 to flow spirally with the optical axis O of the laser beam as the center. Thereby, the occurrence of the turbulence is minimized and dust P5 is blocked by the second laminar flow 26 before reaching the first laminar flow 25.

Figure 3B:
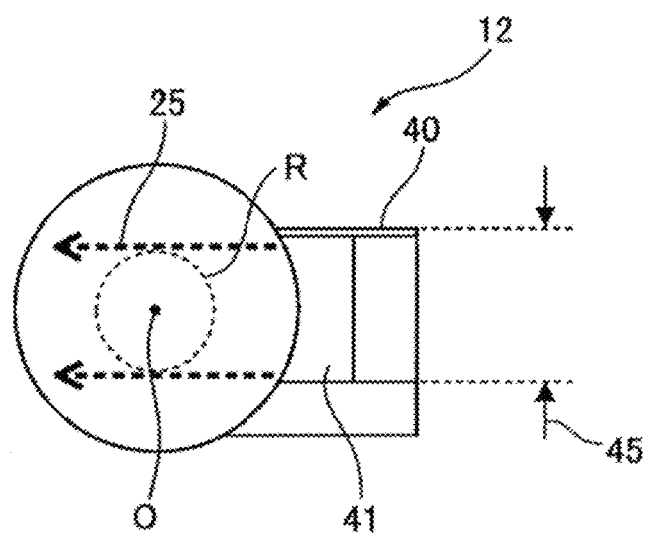
FIG. 3B is a lateral cross-sectional view of a laser machining head taken along a cross-section B-B in FIG. 3A.

FIG. 3B is a lateral cross-sectional view of the laser machining head 12 corresponding to a cross section B-B in FIG. 3A. As illustrated in FIG. 3A and FIG. 3B, the first inflow port 42 includes a first width 44 in a direction of the optical axis O of the laser beam and a second width 45 in a direction perpendicular to the optical axis O of the laser beam and the first width 44 is formed to be smaller than the second width 45. Thereby, a layered flow (the first laminar flow 25) is generated and the occurrence of the turbulence is minimized. Also, the second width 45 of the first inflow port 42 is larger than the beam diameter R of the laser beam. Thereby, the first laminar flow 25 flowing along parallel to the surface of the protection window 23 becomes a flow larger than the beam diameter R of the laser beam and an attachment of dust to a transit area of the laser beam in the protection window 23 is prevented.

Figure 3C:
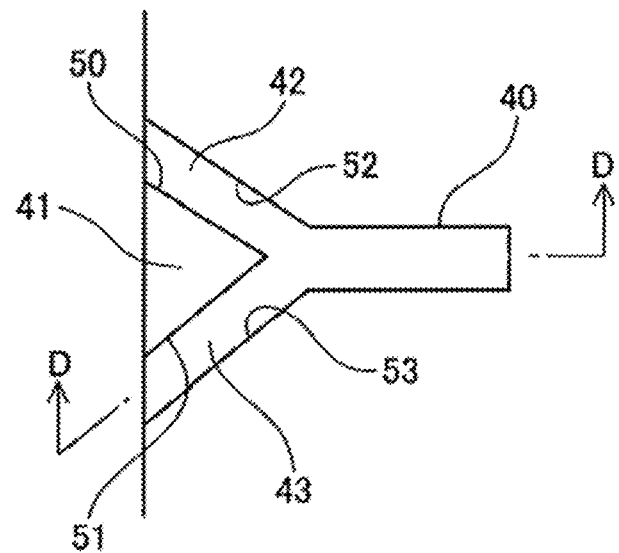
FIG. 3C is an enlarged longitudinal cross-sectional view of an inflow port corresponding to a section C in FIG. 3A.

FIG. 3C is an enlarged longitudinal cross-sectional view of the inflow port 40 corresponding to a section C of FIG. 3A. The flow dividing projection 41 includes a first face 50 and a second face 51 opposite to the first face 50, the first face 50 of the flow dividing projection 41 is parallel to a third face 52 of the first inflow port 42 which faces the first face 50 of the flow dividing projection 41, and the second face 51 of the flow dividing projection 41 is parallel to a fourth face 53 of the second inflow port 43 which faces the second face 51 of the flow dividing projection 41. Thereby, a gas flow flowed in from the first inflow port 42 and the second inflow port 43 is layered.

Figure 3D:
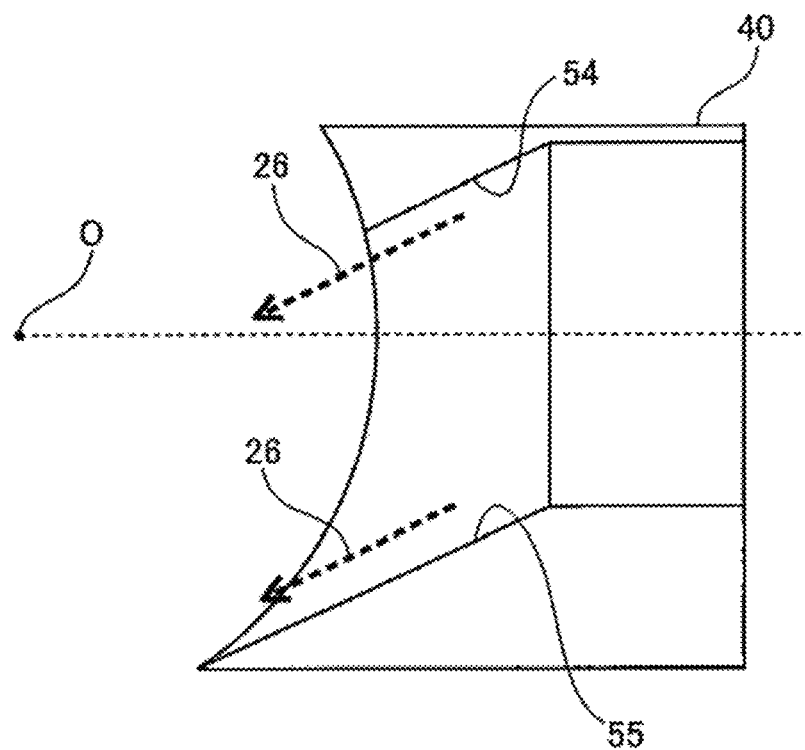
FIG. 3D is an enlarged lateral cross-sectional view of an inflow port taken along a cross-section D-D in FIG. 3C.

FIG. 3D is an enlarged lateral cross-sectional view of the inflow port 40 corresponding to a cross section D-D in FIG. 3C. The second inflow port 43 includes a fifth face 54 and a sixth face 55 inclined with respect to a longitudinal cross section including the optical axis O of the laser beam. Thereby, the second laminar flow 26 spirally turns around the optical axis O of the laser beam as the center toward the workpiece and the occurrence of the turbulence is prevented.

According to the laser machining head 12 of the second embodiment, the protection window 23 is disposed inclined with respect to the optical axis O of the laser beam, thereby a collision angle of dust P4 against the protection window 23 becomes shallow. A two layered gas flow including the first laminar flow 25 flowing along parallel to the surface of the protection window 23 and the second laminar flow 26 flowing spirally with a turn to the workpiece blocks dust P4, P5 before the dust reaches the protection window 23. Thereby, staining of the protection window 23 is further prevented with a simple configuration.

Figure 4A:
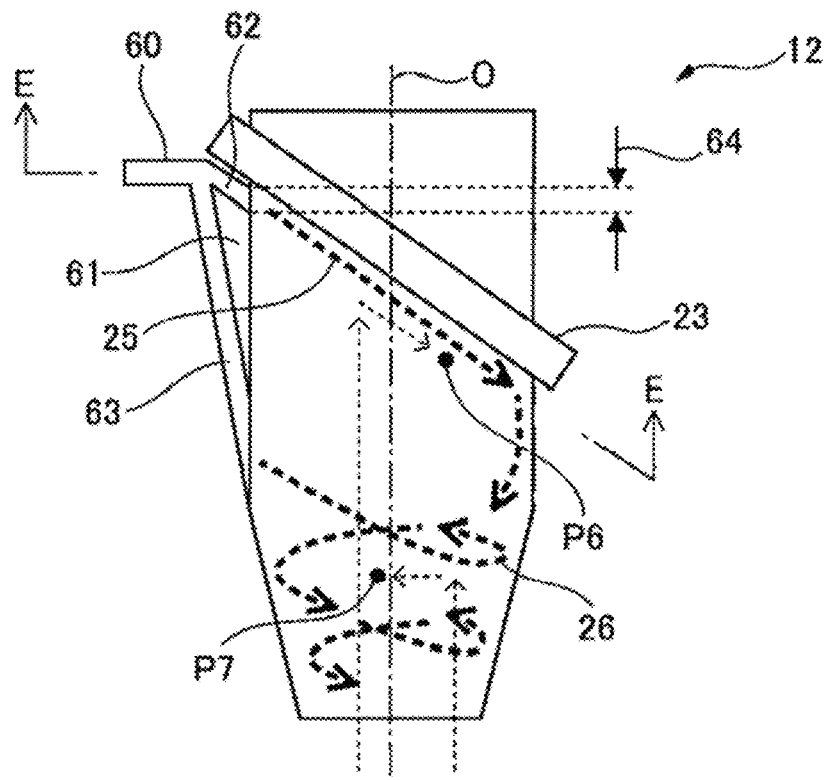
FIG. 4A is a longitudinal cross-sectional view of a laser machining head according to a third embodiment.

FIG. 4A is a longitudinal cross-sectional view of a laser machining head 12 according to a third embodiment. A first inflow port 62 of the third embodiment is different from the first inflow port 42 of the second embodiment in that the first inflow port 62 is disposed configured to allow the first laminar flow 25 to flow from upstream to downstream of the protection window 23. By flowing the first laminar flow 25 from upstream to downstream of the protection window 23, the first laminar flow 25 reached downstream of the protection window hits an inner circumferential surface of the laser machining head 12 with a shallow angle and the first laminar flow 25 is facilitated to direct to the workpiece.

On the other hand, a second inflow port 63 is similar to the second inflow port 43 of the second embodiment and is directed toward a direction toward the workpiece and flows spirally with the optical axis O of the laser beam as the center. Further, a flow dividing projection 61 is similar to the flow dividing projection 41 of the second embodiment and is formed to be tapering toward a direction going away from the laser beam in a longitudinal cross section including the optical axis O of the laser beam.

Figure 4B:
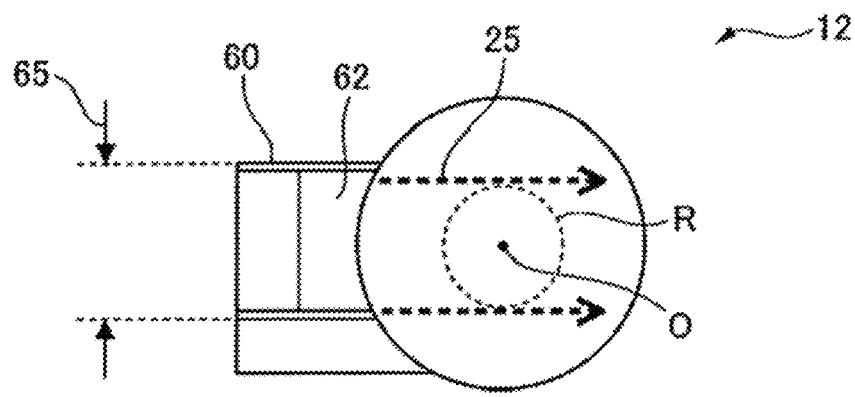
FIG. 4B is a lateral cross-sectional view of a laser machining head taken along a cross-section E-E in FIG. 4A.

FIG. 4B is a lateral cross-sectional view of the laser machining head 12 corresponding to a cross section E-E in FIG. 4A. As illustrated in FIG. 4A and FIG. 4B, the first inflow port 62 includes a first width 64 in a direction of the optical axis O of the laser beam and a second width 65 in a direction perpendicular to the optical axis O of the laser beam and the first width 64 is formed to be smaller than the second width 65. Thereby, a layered flow (the first laminar flow 25) is generated and an occurrence of turbulence is minimized. Also, the second width 65 of the first inflow port 62 is larger than a beam diameter R of the laser beam. Thereby, the first laminar flow 25 flowing along parallel to the surface of the protection window 23 becomes a flow bigger than the beam diameter R of the laser beam and an attachment of dust to a transit area of the laser beam in the protection window 23 is prevented. It should be noted that other configurations of the laser machining head 12 of the third embodiment is the same as the configurations of the laser machining head of the second embodiment.

According to the laser machining head 12 of the third embodiment, disposing the protection window 23 inclined with respect to the optical axis O of the laser beam makes a collision angle of the dust P6 to the protection window 23 shallow. Since the first laminar flow 25 flows upstream to downstream of the protection window 23, the first laminar flow 25 reached downstream of the protection window 23 hits the inner circumference surface of the laser machining head 12 with a shallow angle and is facilitated to direct to the workpiece.

Figure 5:
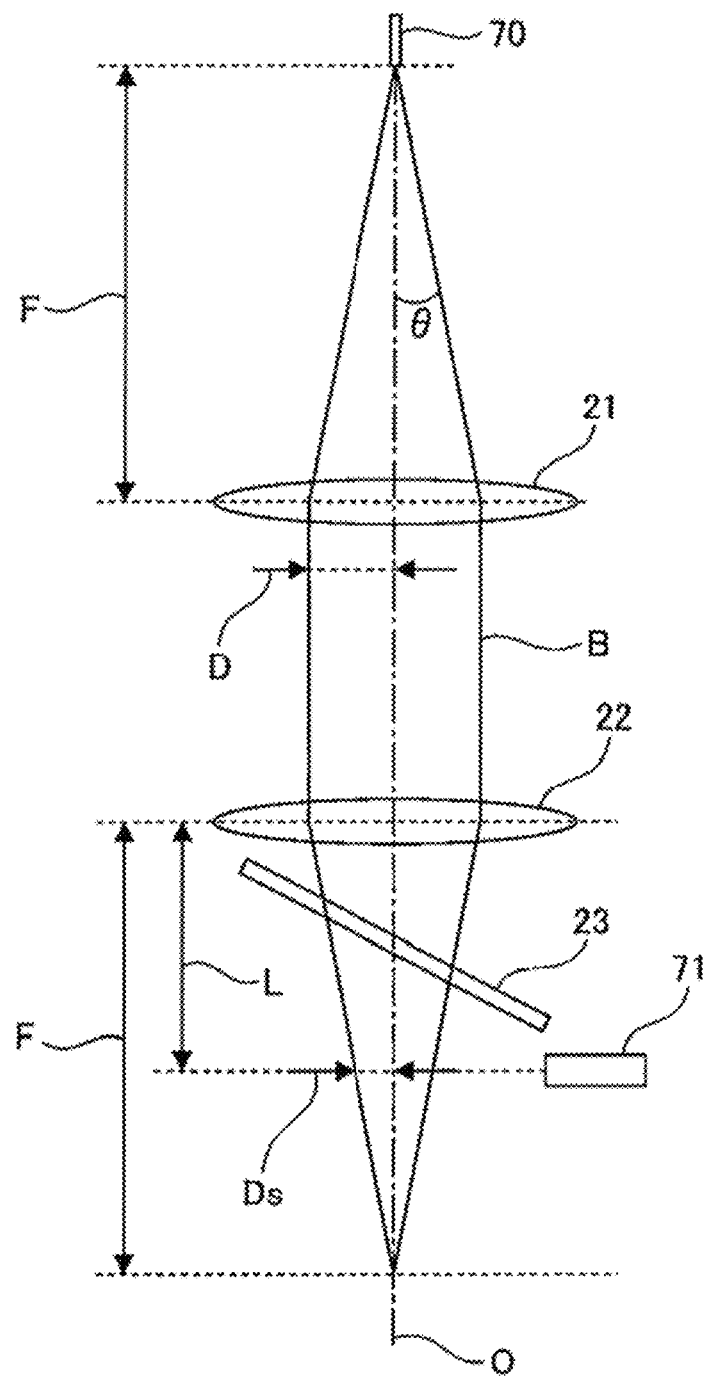
FIG. 5 is a diagram illustrating a method of calculating a beam diameter depicted in FIG. 2B, FIG. 3B and FIG. 4B.

FIG. 5 is a diagram illustrating a method of calculating a beam diameter R explained in FIG. 2B, FIG. 3B and FIG. 4B. In this example, the laser machining device includes an optical fiber 70 having a diameter of 100 μm and numerical aperture NA of 0.08, a collimation lens 21 with a focal distance F of 100 mm, a condenser lens 21 with a focal distance F of 100 mm, a protection window 23 disposed downstream of the condenser lens 22 and inclined with respect to the optical axis O of the laser beam, and an inflow port 71 disposed a distance L from the condenser lens 22 downstream of the protection window 23.

At this time, assuming that a beam divergence angle is θ, NA(0.08)=sin θ and the beam divergence angle θ is arcsin (0.08)≈4.589°. Also, assuming that a beam radius between the collimation lens 21 and the condenser lens 22 is D, D/100 mm=tan(4.589° and the related beam radius D is approximately 8.03 mm. Further, assuming that a beam radius at a position where the inflow port 71 is disposed is Ds, Ds/(100 mm−L)=tan(4.589). Therefore, the beam radius Ds is approximately 0.0802*(100 mm−L). Accordingly, the beam diameter R explained in FIG. 2B, FIG. 3B, and FIG. 4B is Ds multiplied by 2, i.e., 0.1604*(100 mm−L). In view of the above, a width of the inflow port 71 in a direction perpendicular to the optical axis O of the laser beam B is preferably formed to be larger than the beam diameter R.

Although some embodiments have been described in this specification, the present invention is not intended to be limited to the above-described embodiments, and it is to be understood that many changes can be made without departing from the scope of the appended claims.

The invention claimed is:

1. A laser machining head with stain prevention, comprising:
   a protection window disposed inclined with respect to an optical axis of a laser beam;
   an inflow port disposed downstream of the protection window and configured to allow a gas to flow in; and
   a flow dividing projection configured to divide the gas into a first laminar flow flowing along parallel to a surface of the protection window and a second laminar flow flowing toward a workpiece.

2. The laser machining head of claim 1, wherein the flow dividing projection is disposed at a position opposing to the inflow port.

3. The laser machining head of claim 2, wherein the flow dividing projection has a tapered shape tapering toward the inflow port.

4. The laser machining head of claim 2, wherein the flow dividing projection has a shape that transits from a tapered shape tapering toward the inflow port to a trapezoid shape in a cross section including the optical axis of the laser beam.

5. The laser machining head of claim 3, wherein
   the inflow port has a first width in a direction of the optical axis of the laser beam and a second width in a direction of the optical axis of the laser beam, and
   the first width is smaller than the second width.

6. The laser machining head of claim 3, wherein
   the inflow port has a third width in a direction perpendicular to the optical axis of the laser beam and the flow dividing projection has a fourth width in a direction perpendicular to the optical axis of the laser beam, and
   each of the third width and the fourth width is larger than a beam diameter of the laser beam.

7. The laser machining head of claim 1, wherein the flow dividing projection divides the inflow port into a direction parallel to a surface of the protection window and a direction toward the workpiece, and forms a first inflow port and a second inflow port.

8. The laser machining head of claim 7, wherein the first inflow port is directed toward a direction parallel to the surface of the protection window and is configured to allow the first laminar flow to flow from downstream to upstream of the protection window.

9. The laser machining head of claim 7, wherein the first inflow port is directed toward a direction parallel to the surface of the protection window and is configured to allow the first laminar flow to flow from upstream to downstream of the protection window.

10. The laser machining head of claim 7, wherein the second inflow port directs toward the workpiece and is configured to allow the second laminar flow to flow spirally with the optical axis of the laser beam as the center.

11. The laser machining head of claim 7, wherein the first flow dividing projection has a first face and a second face opposite to the first face, the first face of the flow dividing projection is parallel to a third face of the first inflow port facing to the first face of the flow dividing projection, and the second face of the flow dividing projection is parallel to a fourth face of the second inflow port facing to the second face of the flow dividing projection.

12. The laser machining head of claim 7, wherein the second inflow port has a fifth face and a sixth face inclined with respect to a cross section including the optical axis of the laser beam.

13. The laser machining head of claim 7, wherein the flow dividing projection has a tapered shape tapering toward a direction going away from the laser beam in a cross section including the optical axis of the laser beam.

14. The laser machining head of claim 7, wherein the first inflow port has a first width in a direction of the optical axis of the laser beam and a second width in a direction perpendicular to the optical axis of the laser beam, wherein the first width is smaller than the second width.

15. The laser machining head of claim 14, wherein the second width of the first inflow port is larger than a beam diameter of the laser beam.

* * * * *